US012613203B2

(12) United States Patent
Morihisa

(10) Patent No.: US 12,613,203 B2
(45) Date of Patent: Apr. 28, 2026

(54) X-RAY FLUORESCENCE ANALYZER

(71) Applicant: SHIMADZU CORPORATION, Kyoto (JP)

(72) Inventor: Yuji Morihisa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 247 days.

(21) Appl. No.: 18/643,280

(22) Filed: Apr. 23, 2024

(65) Prior Publication Data

US 2024/0393268 A1 Nov. 28, 2024

(30) Foreign Application Priority Data

May 24, 2023 (JP) ................................. 2023-085246

(51) Int. Cl.
G01N 23/223 (2006.01)
(52) U.S. Cl.
CPC ..... G01N 23/223 (2013.01); *G01N 2223/639* (2013.01)

(58) Field of Classification Search
CPC ............. G01N 23/223; G01N 23/2204; G01N 2223/639
See application file for complete search history.

(56) References Cited

U.S. PATENT DOCUMENTS 9,188,553 B2 * 11/2015 Sakuta ................. G01N 23/223

FOREIGN PATENT DOCUMENTS

JP 2004-101404 A 4/2004

* cited by examiner

*Primary Examiner* — Jurie Yun
(74) *Attorney, Agent, or Firm* — Muir Patent Law, PLLC

(57) ABSTRACT

An X-ray fluorescence analyzer has a sample stage with a pass-through surface, an X-ray source for emitting primary X-rays so that the optical axis of the primary X-rays intersects with the pass-through surface obliquely, and a detector for detecting fluorescent X-rays emitted from the sample as a result of irradiation of the primary X-rays to the sample. The optical axis passes through the pass-through surface at a position closer to the X-ray source than the midpoint of the line segment connecting both ends of the pass-through surface along the optical axis.

8 Claims, 10 Drawing Sheets

Controller

141

Processor

142

Memory

Offset of X-ray optical axis

L1=L2

| X-ray optical axis | Passing through P1 |
|---|---|
| Detector axis | Passing through P0 |
| Collimator aperture shape | Circle |
| Margin L1, L2 | Same size |

Offsets of X-ray optical axis and detector axis

| X-ray optical axis | Passing through P1 |
|---|---|
| Detector axis | Passing through P2 |
| Collimator aperture shape | Circle |
| Margin L1, L2 | Same size |

Offsets of X-ray optical axis and detector axis

| X-ray optical axis | Passing through P1 |
|---|---|
| Detector axis | Passing through P2 |
| Collimator aperture shape | Ellipse |
| Margin L1, L2 | Same size |

Offsets of X-ray optical axis and detector axis

| X-ray optical axis | Passing through P1 |
|---|---|
| Detector axis | Passing through P2 |
| Collimator aperture shape | Ellipse (Minor diameter is enlarged) |
| Margin L1, L2 | Same size |

Offset of X-ray optical axis

| X-ray optical axis | Passing through P1 |
|---|---|
| Detector axis | Passing through P0 |
| Collimator aperture shape | Circle (Large) |
| Margin L1, L2 | Same size |

Offsets of X-ray optical axis and detector axis

| X-ray optical axis | Passing through P0 |
|---|---|
| Detector axis | Passing through P0 |
| Collimator aperture shape | Ellipse |
| Margin L1, L2 | Different |

| | Optical axis pass-through position | Detector axis pass-through position | Collimator aperture and its shape |
|---|---|---|---|
| Embodiment 1 | P1 | P0 | Hole 701, Circle |
| Embodiment 2 | P1 | P2 | Hole 701, Circle |
| Embodiment 3 | P1 | P2 | Hole 702, Ellipse |
| Embodiment 4 | P1 | P2 | Hole 703, Ellipse (Minor diameter is enlarged) |
| Embodiment 5 | P1 | P0 | Hole 704, Circle (Large) |
| Embodiment 6 | P0 | P0 | Hole 702, Ellipse |
| Comparative Example | P0 | P0 | Hole 701a, Circle |

FIG. 15

| X-ray optical axis | Passing through P0 |
|---|---|
| Detector axis | Passing through P0 |
| Collimator aperture shape | Circle |
| Margin L1, L2 | Same size |

X-RAY FLUORESCENCE ANALYZER

CROSS-REFERENCE TO RELATED APPLICATIONS

This application claims priority under 35 U.S.C. § 119 to Japanese Patent Application No. 2023-085246 filed on May 24, 2023, the entire disclosure of which is incorporated herein by reference in its entirety.

BACKGROUND OF THE INVENTION

Field of the Invention

The present disclosure relates to a fluorescent X-ray analyzer.

Description of the Related Art

The following description sets forth the inventor's knowledge of the related art and problems therein and should not be construed as an admission of knowledge in the prior art.

An X-ray fluorescence analysis is a method of analyzing constituent elements of a sample by irradiating the sample with X-rays and measuring the fluorescent X-rays emitted from the sample.

Japanese Unexamined Patent Application Publication No. 2004-101404 describes an X-ray fluorescence analyzer that performs a surface analysis of a sample by irradiating the sample with X-rays and detecting characteristic X-rays, secondary electrons, reflected electrons, and photoelectrons obtained from the sample due to X-ray irradiation.

An X-ray fluorescence analyzer is equipped with a sample stage with a through-hole. The sample is placed on the opening surface of the through-hole. The X-ray source emits primary X-rays from obliquely below the sample stage toward the opening surface. Conventionally, a collimator with a circular aperture is provided between the X-ray source and the opening surface. Primary X-rays pass through the aperture formed in the collimator and are directed to the opening surface. The irradiation region of the primary X-rays extends from the X-ray source in a conical shape centering on the optical axis of the primary X-rays.

When the primary X-rays are emitted toward the opening surface, an irradiation surface of the primary X-rays is formed on the opening surface. The shape of the irradiation surface is a distorted ellipse, resembling a circle stretched in one direction. The primary X-rays that have passed through the opening surface are directed to the sample. The sample is, in some instances, placed on the opening surface, with the sample housed in a sample container.

To assure the reproducibility of the analysis, the irradiation range of primary X-rays to the sample must be the same for each analysis process. In the case where the positional displacement of the sample placed on the opening surface is large between the first analysis process and the second analysis process, the irradiation range of the primary X-rays to the sample will change significantly.

In this case, the reproducibility of the analysis cannot be guaranteed. In particular, when the irradiation surface reaches the edge of the opening surface, the change in the irradiation range of primary X-rays due to misalignment becomes significant. For this reason, conventionally, the beam spread of the primary X-rays is adjusted by the aperture of the collimator so that a margin (dead area) is provided between the edge of the opening surface and the irradiation surface.

From the standpoint of analysis sensitivity, it is preferable to keep the margin as small as possible to ensure that the irradiation range of the primary X-rays to the sample does not become narrower. Therefore, to ensure analytical reproducibility and enhance analytical sensitivity, it is crucial to adjust the margin so that the edges of the irradiation surface do not reach the opening surface, while maximizing the size of the irradiation surface.

However, conventionally, the large margin of the irradiation surface relative to the opening surface results in a narrow X-ray irradiation range for the sample.

SUMMARY OF THE INVENTION

The present disclosure has been made to solve the above-described problems, and aims to provide an X-ray fluorescence analyzer capable of extending the irradiation range of X-rays to a sample.

One aspect of the present disclosure relates to an X-ray fluorescence analyzer. The X-ray fluorescence analyzer for analyzing a sample, includes:

a sample stage provided with a pass-through surface through which primary X-rays pass;

an X-ray source configured to emit the primary X-rays such that an optical axis of the primary X-rays intersects with the pass-through surface obliquely; and a detector configured to detect fluorescent X-rays emitted from the sample when the sample arranged to cover the pass-through surface is irradiated with the primary X-rays, wherein the optical axis passes through the pass-through surface at a position closer to the X-ray source than a midpoint of a line segment connecting both ends of the pass-through surface along the optical axis, when the sample stage is viewed in plan view.

Another aspect of the present disclosure relates to an X-ray fluorescence analyzer. The X-ray fluorescence analyzer for analyzing a sample, includes:

a sample stage provided with a pass-through surface through which primary X-rays pass;

an X-ray source configured to emit the primary X-rays such that an optical axis of the primary X-rays intersects with the pass-through surface obliquely;

a detector configured to detect fluorescent X-rays emitted from the sample when the sample arranged to cover the pass-through surface is irradiated with the primary X-rays; and an adjustment member provided between the X-ray source and the pass-through surface, the adjustment member having an aperture to adjust a size of a beam of the primary X-rays, wherein in a case of assuming a line segment connecting both ends of the pass-through surface along the optical axis when the sample stage is viewed in plan view, when viewed along a direction of the optical axis, a size of the aperture is greater in a first direction orthogonal to the line segment in the pass-through surface than in a second direction orthogonal to both the first direction and the pass-through surface.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present disclosure are shown by way of example, and not limitation, in the accompanying figures.

FIG. 1 is a schematic diagram showing the overall configuration of an X-ray fluorescence analyzer according to Embodiment 1.

FIG. 15 shows a comparison table for comparing the configuration of each Embodiment and Comparative Example.

DETAILED DESCRIPTION OF THE PREFERRED EMBODIMENTS

In the following paragraphs, some preferred embodiments of the present disclosure will be described by way of example and not limitation. It should be understood that, based on this disclosure, various other modifications can be made by those skilled in the art based on these illustrated embodiments.

Note that the same or equivalent part in the figures is assigned by the same reference symbol, and the description will not be repeated.

Embodiment 1

<Description of Schematic Configuration>

Figure 1:
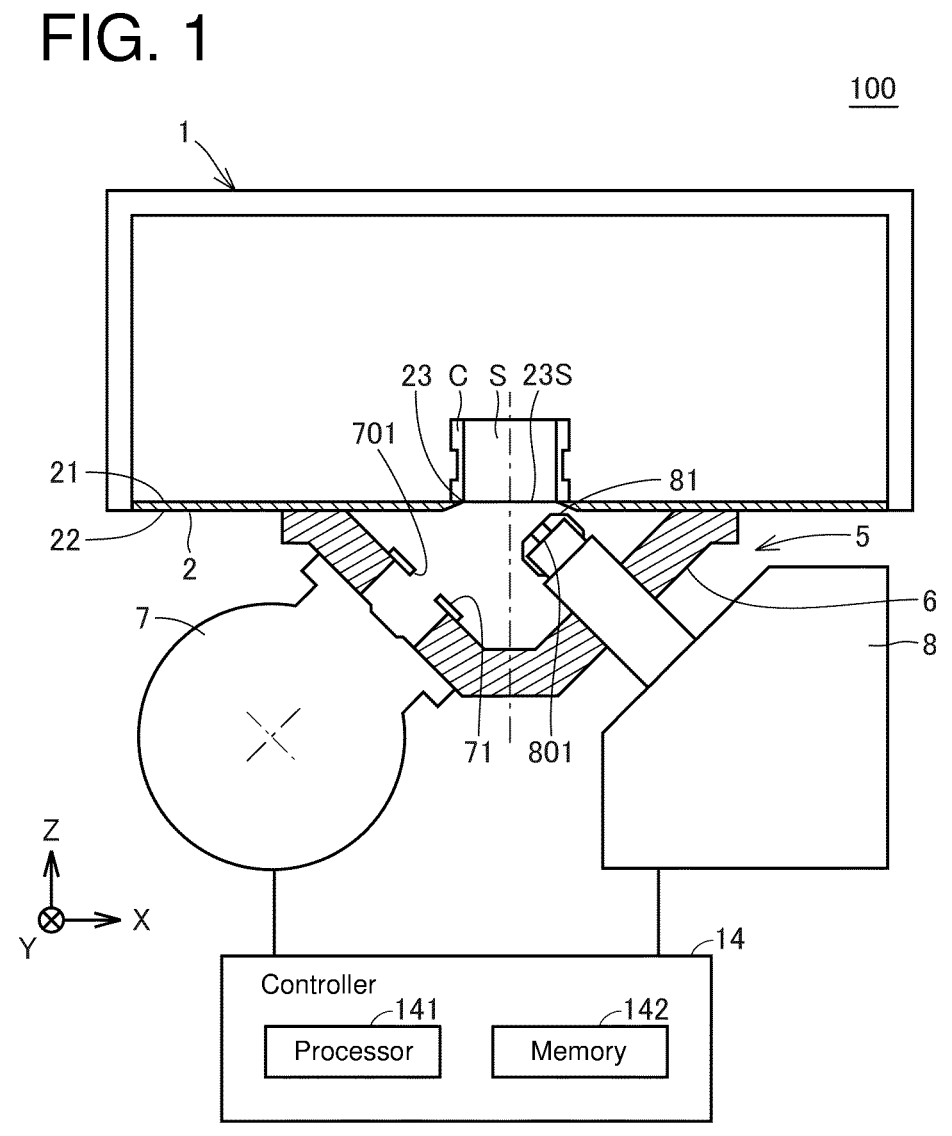
Figure 2:
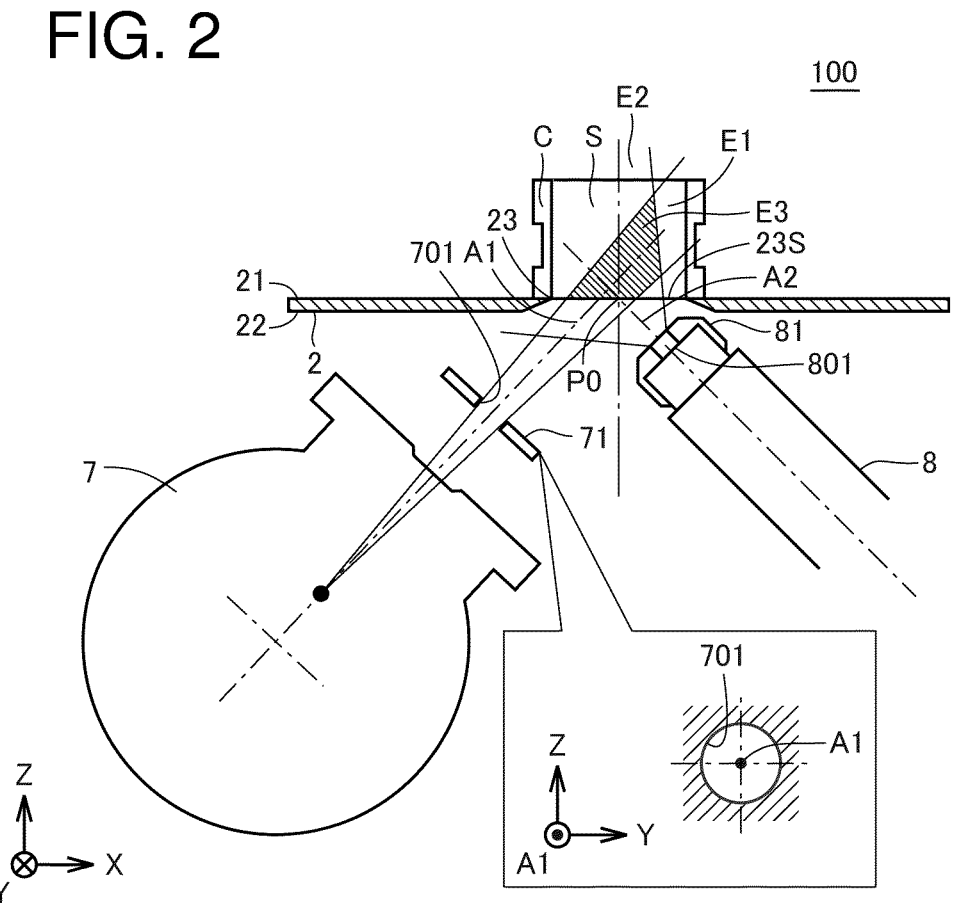
FIG. 2 is a diagram showing the main parts of the X-ray fluorescence analyzer according to Embodiment 1.
Figure 3:
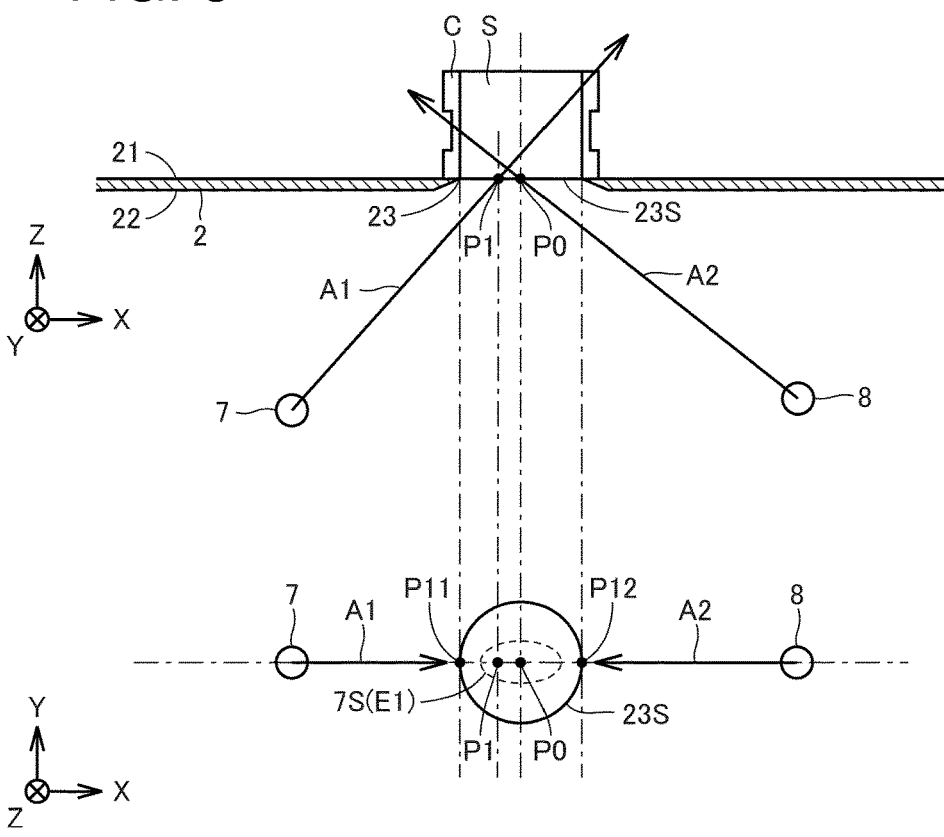
FIG. 3 is a diagram describing a state in which the optical axis of the primary X-rays passes through the opening surface at a position closer to the X-ray tube than the midpoint of the line segment connecting both ends of the opening surface along the optical axis.
Figure 4:
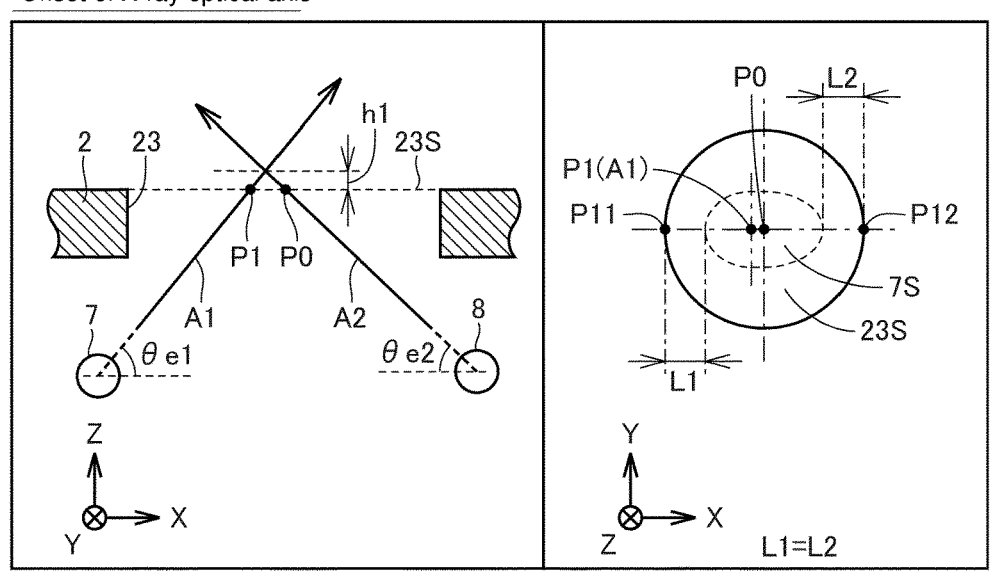
FIG. 4 is a diagram describing the relation between the opening surface, the optical axis of the primary X-rays, the detector axis, and the irradiation surface according to Embodiment 1.

FIG. 1 is a schematic diagram showing the overall configuration of an X-ray fluorescence analyzer 100 according to Embodiment 1. FIG. 2 is a diagram showing the main parts of the X-ray fluorescence analyzer 100 according to Embodiment 1. FIG. 3 is a diagram describing a state in which the optical axis A1 of the primary X-rays passes through the opening surface 23S at a position closer to the X-ray tube 7 than the midpoint of the line segment connecting both ends of the opening surface 23S along the optical axis A1. FIG. 4 is a diagram describing the relation between the opening surface 23S, the optical axis A1 of the primary X-rays, the detector axis A2, and the irradiation surface 7S according to Embodiment 1.

The X-ray fluorescence analyzer 100 is an energy-dispersive X-ray fluorescence spectrometer (EDX), which measures the concentration of elements contained in a sample S. As shown in FIG. 1, the X-ray fluorescence analyzer 100 is equipped with a sample chamber 1, a measurement chamber 5, and a controller 14. The space inside the sample chamber 1 and the space inside the measurement chamber 5 are enclosed in an airtight manner.

A sample stage 2 is provided at the bottom of the sample chamber 1. Hereafter, the direction perpendicular to the sample stage 2 is defined as a Z-axis direction, and the plane parallel to the plane of the sample stage 2 is defined as an X-Y plane. With respect to the sample stage 2, the positive direction of the Z-axis may be referred to as "upward," and the negative direction of the Z-axis may be referred to as "downward."

The sample stage 2 is a flat plate-like member for placing a sample S. The sample stage 2 includes a through-hole 23, designed to extend through the top surface 21 and the bottom surface 22. The sample S is either a powder or a liquid. The sample S shown in FIG. 1 is held in a sample container C for holding the sample S.

The sample container C is a cylindrical member made of resin. The opening at the bottom end of the tubular member is closed by being covered with a resin film. When analyzing a sample S, the user places the sample container C on the opening surface 23S of the through-hole 23 so that the through-hole 23 is covered by the opening at the bottom end of the cylindrical member. With this, the lower surface of the sample S is exposed to the measurement chamber 5 via the opening surface 23S.

Note that the opening surface 23S is a virtual surface formed by the through-hole 23. Since the film covering the opening at the lower end of the tubular member is very thin, the lower surface 22 of the sample stage 2 and the height of the sample lower surface in the Z-axis direction are approximately equivalent.

The sample S may be an individual sample of an element with a large atomic number, such as a metal, in which fluorescent X-rays are emitted from the bottom of the sample. The sample S may be a powder sample or a liquid sample that emits fluorescence in a three-dimensional manner from the inner surface of the sample. The sample S may be a solid sample larger than a powder. In that case, the sample S may be placed directly on the top surface 21 to cover the opening surface 23S without being contained in the sample container C.

An X-ray tube 7 and a detector 8 are installed on the wall 6 of the measurement chamber 5. The X-ray tube 7 emits primary X-rays so that the optical axis A1 of the primary X-rays intersects with the opening surface 23S obliquely. The primary X-rays pass through the opening surface 23S and are irradiated onto the sample S. Fluorescent X-rays (secondary X-rays) emitted by the sample S enter the detector 8. The detector 8 measures the energy and the intensity of the fluorescent X-rays.

The opening surface 23S is one example of a pass-through surface through which primary X-rays can pass. Note that the present disclosure is not intended to positively exclude a configuration in which the opening surface 23S is covered by some material that is permeable to primary X-rays. In other words, the opening surface 23S is not a virtual surface formed by the through-hole 23, but may be a surface shaped by a member through which primary X-rays can penetrate. Thus, the pass-through surface is not limited to only a virtual opening surface.

The X-ray tube 7 is one example of an X-ray source. The X-ray tube 7 has a filament that emits thermal electrons, a target that converts the thermal electrons into specified primary X-rays and emits them, and a housing. In the housing, a filament and a target are accommodated. Primary X-rays emitted from the X-ray tube 7 are a conical beam (cone beam).

The measurement chamber 5 is equipped with a collimator 71. The collimator 71 has an aperture (primary aperture) 701 to adjust the beam size of the primary X-rays. The collimator 71 is made of an X-ray absorbing material, such as, e.g., lead and brass. As shown in FIG. 2, the shape of the aperture 701 is a circle (true circle). The optical axis A1 of the primary X-rays passes through the center of the aperture 701. The collimator 71 is one example of an adjustment member in which an aperture is formed to adjust the beam size of the primary X-rays. The primary X-rays, whose beam size is adjusted by the collimator 71, spread out in a conical shape centered on the optical axis A1 and irradiate onto the irradiation range E1. The irradiation range E1 includes a part of the opening surface 23S.

The sample S emits fluorescent X-rays (secondary X-rays) when irradiated with primary X-rays. The detector 8 detects fluorescent X-rays. At the tip of the detector 8, a cap 81 with an aperture (secondary aperture) is attached. The detection range E2, within which the detector 8 can detect fluorescent X-rays, extends in a conical shape centering on the detector axis (central axis) A2 passing through the aperture 801. The detector axis A2 is one example of the central axis of the detection range E2 of the detector 8. The detection range E2 includes at least a part of the opening surface 23S. As shown in FIG. 2, an overlapping range E3, where the irradiation range E1 and the detection range E2 overlap, is formed above the top surface 21 of the sample stage 2.

The overlapping range E3 is defined as a valid range for measuring a sample. The overlapping range E3 constitutes, for example, a conical shape with a part of the opening surface 23S as the bottom surface. Therefore, the larger the size of the bottom surface of the overlapping range E3 and the higher the height of the overlapping range E3 in the Z-axis direction, the greater the effective range for measuring the sample.

The fluorescent X-rays emitted from the sample S included in the overlapping range E3 pass through the through-hole 23 and enter into the detector 8. The detector 8 measures the energy and intensity of the incident X-ray fluorescence. The detection results of the detector 8 are represented, for example, as a fluorescent X-ray spectrum showing the relation between the energy and the quantity of the detected fluorescent X-rays.

To the controller 14, the X-ray tube 7 and the detector 8 are connected. The controller 14 acquires the fluorescent X-ray spectrum detected by the detector 8. The controller 14 performs quantitative analysis of each element based on the spectrum of the X-ray fluorescence detected by the detector 8. To the controller 14, an imaging device for imaging the opening surface 23S and a display device for displaying the images captured by the imaging device may be connected.

As the controller 14, for example, a personal computer can be used. The controller 14 is equipped with a processor 141 and a memory 142 that stores programs and data. The memory 142 includes a ROM (Read Only Memory), a RAM (Random Access Memory), and an SSD (Solid State Drive). In place of an SSD, an HDD (Hard Disk Drive) may be included.

The ROM stores programs to be executed by the processor 141. The RAM functions as a temporary data memory for temporarily storing data used during program execution in the processor 141 and used as a work region. The SSD is a nonvolatile storage device that stores measurement results and other data from the X-ray fluorescence analyzer 100.

The processor 141 is typically composed of a CPU (Central Processing Unit) or an MPU (Multi-Processing Unit). The processor 141 realizes various processing by reading and executing the program stored in the memory 142. The processor 141 is one example of an operation device. The processor 141 is also one example of a processing circuitry.

Description of Comparative Example

Figure 16:
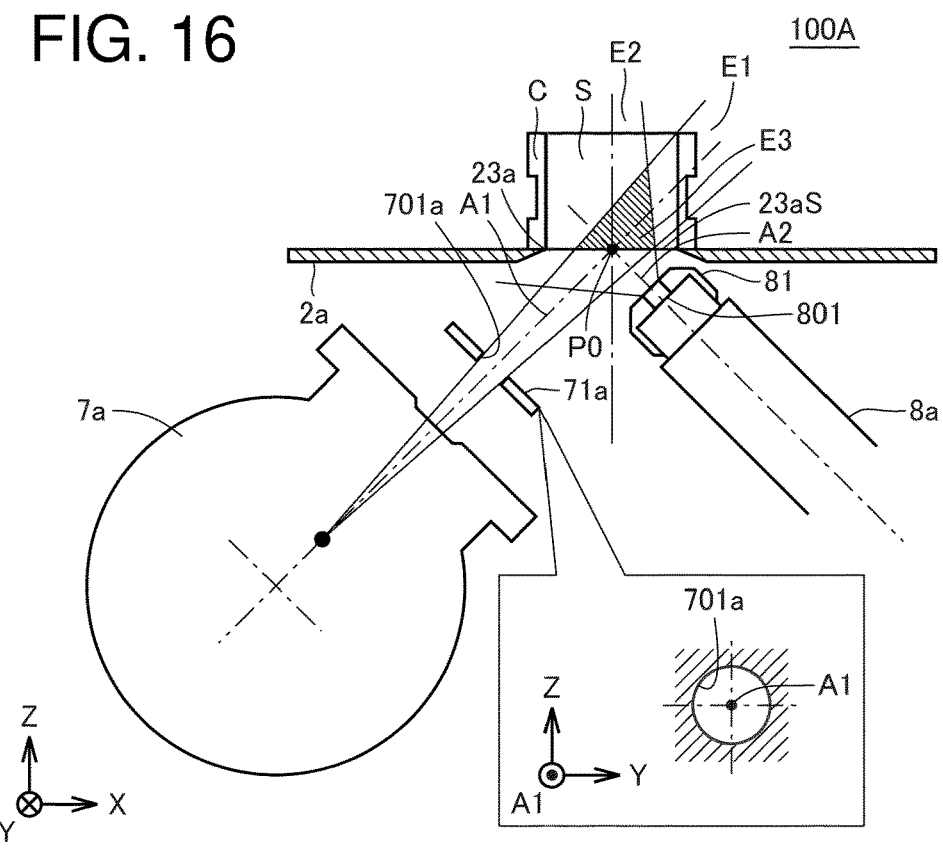
FIG. 16 is a diagram showing the main parts of the X-ray fluorescence analyzer according to Comparative Example.
Figure 17:
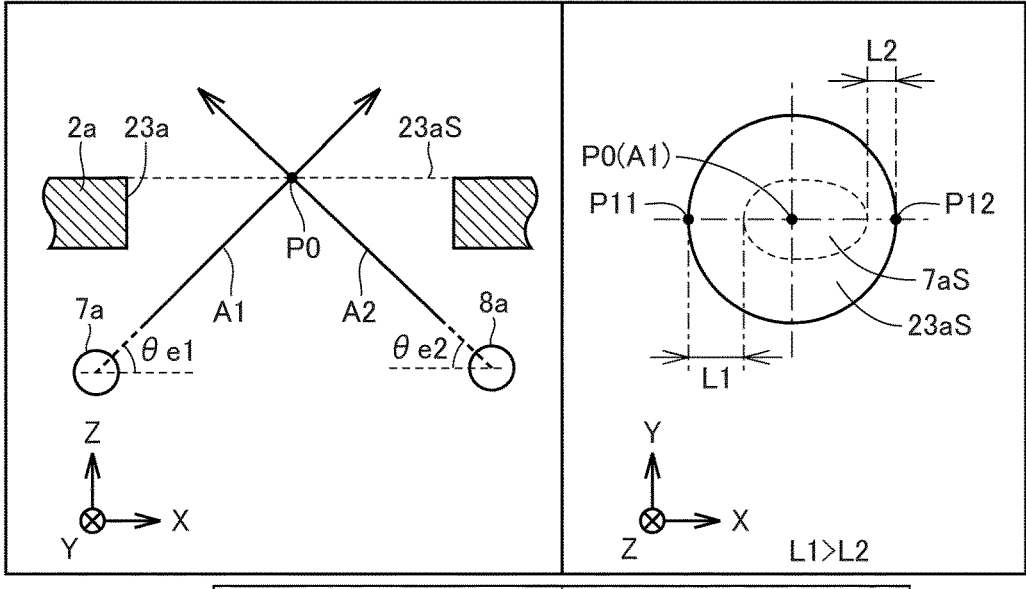
FIG. 17 is a diagram describing the relation between the opening surface, the optical axis of the primary X-rays, the detector axis, and the irradiation surface according to Comparative Example.

Before describing the X-ray fluorescence analyzer 100 in more detail, Comparative Example will be described. FIG. 16 is a diagram showing the main parts of the X-ray fluorescence analyzer 100A according to Comparative Example. FIG. 17 is a diagram describing the relation between the opening surface 23aS, the optical axis A1 of the primary X-rays, the detector axis A2, and the irradiation surface 7aS, with respect to Comparative Example. FIG. 16 is intended to be contrasted with FIG. 2, which depicts Embodiment 1. FIG. 17 is intended to be contrasted with FIG. 4, which depicts Embodiment 1.

As shown in FIG. 16, the X-ray fluorescence analyzer 100A according to Comparative Example is equipped with a sample stage 2a, an X-ray tube 7a, and a detector 8a. The sample stage 2a has a through-hole 23a. The primary X-rays emitted from the X-ray tube 7a pass through the collimator 71a, which has a circular (true circle) shaped aperture 701a, and are irradiated onto the opening surface 23aS.

FIG. 17 shows a diagram of the opening surface 23aS as viewed from the Y-axis direction, a diagram of the opening surface 23aS as viewed in plan from the Z-axis direction (viewed from below the sample stage 2a, and a table describing the features of Comparative Example. As shown in FIG. 17, in Comparative Example, the optical axis A1 of the primary X-rays and the detector axis A2 pass through the central point P0 of the opening surface 23aS. In other words, in Comparative Example, the optical axis A1 of the primary X-rays and the detector axis A2 intersect at the central point P0 of the opening surface 23aS.

When the primary X-rays are irradiated onto the opening surface 23aS, an irradiation surface 7aS of the primary X-rays is formed on the opening surface 23aS. The irradiation surface 7aS corresponds to a cutting plane that appears when the cone formed by the primary X-ray beam is cut using a plane that diagonally crosses the cone axis. As illustrated in FIG. 17, the irradiation surface 7aS is located within the boundary of the opening surface 23aS. From the perspective of analytical sensitivity, it is advantageous to expand the irradiation surface 7aS to be as large as possible. However, if the X-ray fluorescence analyzer 100A is designed such that the irradiation surface 7aS extends to the edge of the opening surface 23aS, analysis reproducibility may be compromised. Hereinafter, the reasons for this will be described.

To ensure the reproducibility of the analysis, the irradiation range of the primary X-rays to the sample must be the same for each analysis process. In the case where the sample's displacement on the opening surface 23aS is substantial between the first analysis process and the second analysis process, the irradiation range of the primary X-rays on the sample will undergo a significant change. Therefore, in the case where the X-ray fluorescence analyzer 100A is designed so that the irradiation surface 7aS extends to the edge of the opening surface 23aS, the analysis reproducibility may not be assured. In particular, when the irradiation surface 7aS extends to the edge of the opening surface 23aS, the change in the irradiation range of the primary X-rays due to misalignment becomes significant.

Therefore, a margin (dead area) is conventionally provided between the irradiation surface and the edge of the opening surface. In Comparative Example, the size of the aperture 701a of the collimator 71a is adjusted to yield such a margin. By modifying the size of the aperture 701a of the collimator 71a, the irradiation surface 7aS is ensured to fall within the range of the opening surface 23aS.

As illustrated in FIG. 17, the shape of the irradiation surface 7aS is a distorted ellipse, which is derived by elongating a circle from the negative to the positive direction of the X-axis, in response to the elevation angle $\theta e1$ of the optical axis A1 relative to the opening surface 23aS. Consequently, the major axis of the irradiation surface 7aS is aligned with the X-axis direction When the optical axis A1 passes through the central point P0 and the primary X-rays are directed from the negative to the positive direction of the X-axis, the centroid of the major axis of the irradiation surface 7aS is displaced towards the positive direction of the X-axis relative to the central point P0.

Here, when the major axis of the irradiation surface 7aS is extended in both the positive and negative directions of the X-axis, the points of intersection with the edges of the opening surface 23aS are designated as a point P11 and a point P12. As shown in FIG. 17, the first margin L1, extending from one end of the irradiation surface 7aS in the major axis direction to the point P11, and the second margin L2, extending from the other end in the major axis direction to the point P12, differ.

More specifically, the first margin L1 is larger than the second margin L2. This is because the center of the major axis of the irradiation surface 7aS is offset in the positive X-axis direction relative to the central point P0. To reduce the margins, it is necessary to adjust the margins based on the narrower second margin. Adjusting the margins based on the larger first margin L1 risks causing the edge of the irradiation surface 7aS to potentially overhang the opening surface 23aS.

As a result, in Comparative Example, even if the first margin L1 and the second margin L2 are adjusted to bring the size of the irradiation surface 7aS closer to the size of the opening surface, the first margin L1 becomes larger than necessary. Therefore, in Comparative Example, the irradiation range of the X-rays relative to the sample in the X-axis direction is narrow.

Further, in Comparative Example, the size of the irradiation surface 7aS in the Y-axis direction is smaller than the size of the irradiation surface 7aS in the X-axis direction. For this reason, Comparative Example does not fully exploit the Y-axis directional area of the opening surface 23aS for use as an irradiation surface. The irradiation surface 7aS has an elliptical shape due to the major axis being aligned along the X-axis direction. For this reason, if the irradiation surface 7aS is enlarged in the Y-axis direction of the opening surface 23aS, the X-axis directional size of the irradiation surface 7aS will exceed the edges of the opening surface 23aS before the irradiation surface 7aS reaches the Y-axis directional edge of the opening surface 23aS. Therefore, in Comparative Example, the irradiation range of X-rays relative to the sample becomes narrow not only in the X-axis direction but also in the Y-axis direction.

Comparison Between Embodiment 1 and Comparative Example

Next, Embodiment 1 will be described in comparison with Comparative Example. In Embodiment 1, the beam of the primary X-rays emitted from the X-ray tube 7 is projected onto the opening surface 23S, thereby forming the irradiation surface 7S on the opening surface 23S (see FIG. 4).

To simplify the explanation, in the present disclosure, it is assumed that the elevation angle $\theta 2$ of the detector axis A2 and the aperture 801 of the cap 81 are designed so that the entire area of the irradiation surface 7S is included in the detection range E2 of the detector 8. For this reason, in the present disclosure, it will be described that the base of the cone forming the overlapping range E3 coincides with the irradiation surface 7S. It goes without saying that the present disclosure does not intend to specifically exclude instances where the detection range E2 of the detector 8 does not encompass the entire area of the irradiation surface 7S. In other words, it may be configured such that a part of the irradiation surface 7S does not fall within the detection range E2 of the detector 8.

In Comparative Example, the optical axis A1 of the primary X-rays passes through the central point P0 of the opening surface 23aS. In contrast, in Embodiment 1, the optical axis A1 of the primary X-rays does not pass through the central point P0 of the opening surface 23S (see FIG. 4).

In Embodiment 1, the position at which the X-ray optical axis A1 passes through the opening surface 23S is offset from the central point P0 toward the negative direction of the X-axis, as viewed in a plan view of the sample stage 2. In other words, in Embodiment 1, the elevation angle $\theta e1$ of the optical axis A1 relative to the opening surface 23S is larger than the elevation angle $\theta e1$ of the optical axis A1 according to Comparative Example.

Offsetting the pass-through point of the optical axis A1 from the central point P0 in the negative direction of the X-axis causes the position of the irradiation surface 7S to be shifted in the negative direction of the X-axis. In Embodiment 1, the elevation angle θe1 of the optical axis A1 is designed so that the first margin L1 and the second margin L2 are identical. As a result, the optical axis A1 passes through the opening surface 23S at the point P1. As shown in FIG. 3 and FIG. 4, the optical axis A1 of the primary X-rays passes through the opening surface 23S at the point P1 closer to the X-ray tube 7 than the midpoint (central point P0) of the line segment (P11 to P12) connecting both ends of the opening surface 23S along the optical axis A1 (when the sample stage 2 is viewed in the plane (from the Z-axis direction).

Therefore, in the case of Embodiment 1, the first margin L1 and the second margin L2 can be reduced without considering the variation of the first margin L1 and the second margin L2. Thus, according to Embodiment 1, as compared with Comparative Example, the size of the irradiation surface 7S in the X-axis direction can be enlarged to nearly the edge of the opening surface 23S. For example, by making the size of the aperture 701 formed in the collimator 71 larger than the aperture 701a formed in the collimator 71a according to Comparative Example, the size of the irradiation surface 7S in the X-axis direction can be made to be larger than that of the irradiation surface 7aS according to Comparative Example.

According to Embodiment 1, it is possible to provide an X-ray fluorescence analyzer 100 capable of extending the irradiation range of X-rays to the sample to the extent that misalignment of the sample positioned on the opening surface 23S does not have a significant effect on the measurement result.

Further, in Embodiment 1, the optical axis A1 passes through the point P1 offset in the negative direction of the X-axis from the central point P0 of the opening surface 23S, so that the optical axis A1 and the detector axis A2 intersect above the opening surface 23S (see FIG. 4). FIG. 4 shows that the optical axis A1 and the detector axis A2 intersect at a height h1 in the Z-axis direction from the opening surface 23S. The sample S is placed above the opening surface 23S using the sample container C. As shown in FIG. 3, when the sample stage 2 is viewed in plan view, the optical axis A1 and the detector axis A2 are aligned on the same straight line. In other words, in Embodiment 1, in a plane that includes the optical axis A1 and is perpendicular to the opening surface 23S, the optical axis A1 and the detector axis A2 intersect on the side where the sample is placed, out of both sides of the opening surface 23S.

As a result, in Embodiment 1, compared with Comparative Example, the overlapping range E3 between the irradiation range E1 and the detection range E2 is expanded in the positive direction of the Z-axis. In other words, according to Embodiment 1, it is possible to elevate not only the bottom of the cone (irradiation surface 7S) that defines the overlapping range E3, but also the cone's height. Therefore, according to Embodiment 1, it is possible to expand the effective range for measuring a sample both in the direction along the opening surface 23S and in the direction perpendicular to the opening surface 23S.

Embodiment 2

Figure 5:
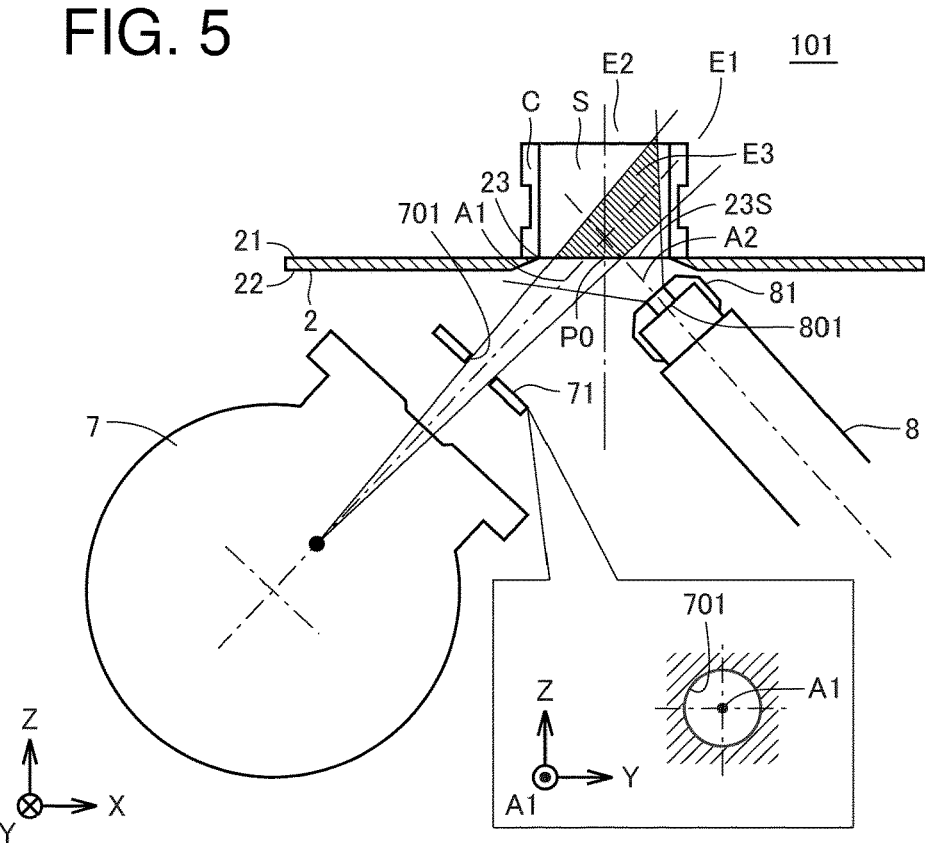
FIG. 5 is a diagram showing the main parts of the X-ray fluorescence analyzer according to Embodiment 2.
Figure 6:
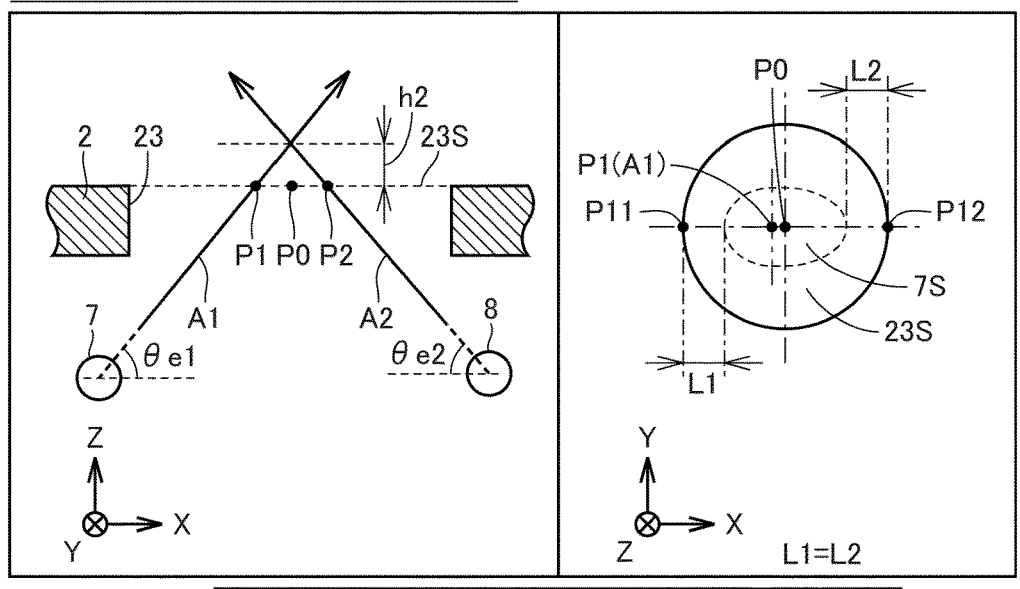
FIG. 6 is a diagram describing the relation between the opening surface, the optical axis of the primary X-rays, the detector axis, and the irradiation surface according to Embodiment 2.

Next, referring to FIG. 5 and FIG. 6, Embodiment 2 will be described. FIG. 5 is a diagram showing the main parts of the X-ray fluorescence analyzer 101 according to Embodiment 2. FIG. 6 is a diagram describing the relation between the opening surface 23S, the optical axis A1 of the primary X-rays, the detector axis A2, and the irradiation surface 7S according to Embodiment 2. FIG. 5 is intended to be contrasted with FIG. 2, which describes Embodiment 1. FIG. 6 is intended to be contrasted with FIG. 4, which illustrates Embodiment 1.

Embodiment 2 will be described in contrast to Embodiment 1. In Embodiment 1, the detector axis A2 passes through the central point P0 of the opening surface 23S. In contrast, in Embodiment 2, the detector axis A2 does not pass through the central point P0 of the opening surface 23S. Embodiment 2 is identical in configuration to Embodiment 1, except for this aspect. Hence, in Embodiment 2, as in Embodiment 1, the optical axis A1 passes through the point P1 on the opening surface 23S. Therefore, according to Embodiment 2, as in Embodiment 1, it is possible to provide an X-ray fluorescence analyzer 100 capable of extending the X-ray irradiation range with respect to the sample to such an extent that the misalignment of the sample positioned on the opening surface 23S does not have a significant effect on the measurement result.

As shown in FIG. 5 and FIG. 6, in Embodiment 2, the detector axis A2 passes through the point P2, which is offset in the positive direction of the X-axis from the central point P0 of the opening surface 23S. Therefore, in Embodiment 2, the position at which the optical axis A1 and the detector axis A2 intersect is different from that of Embodiment 1. More specifically, in Embodiment 2, the optical axis A1 and the detector axis A2 intersect at a position farther in the positive direction of the Z-axis than in Embodiment 1. FIG. 6 shows that the optical axis A1 and the detector axis A2 intersect at a height h2 in the Z-axis direction from the opening surface 23S. In contrast, in Embodiment 1, the optical axis A1 and the detector axis A2 intersect at a height h1 in the Z-axis direction from the opening surface 23S. Here, "h2>h1" is established.

As a result, in Embodiment 2, the overlapping range E3 between the irradiation range E1 and the detection range E2 is expanded in the positive Z-axis direction compared with Embodiment 1. Therefore, according to Embodiment 2, compared with Embodiment 1, the effective range for measuring the sample can be further expanded in a direction orthogonal to the opening surface 23S.

Embodiment 3

Figure 7:
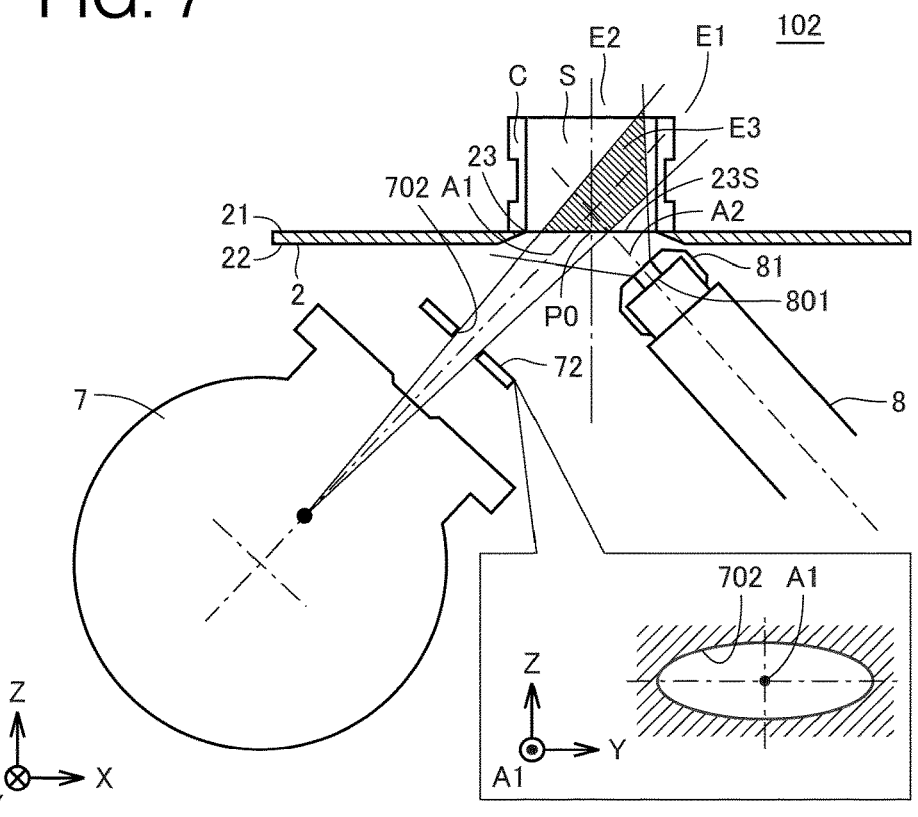
FIG. 7 is a diagram showing the main parts of the X-ray fluorescence analyzer according to Embodiment 3.
Figure 8:
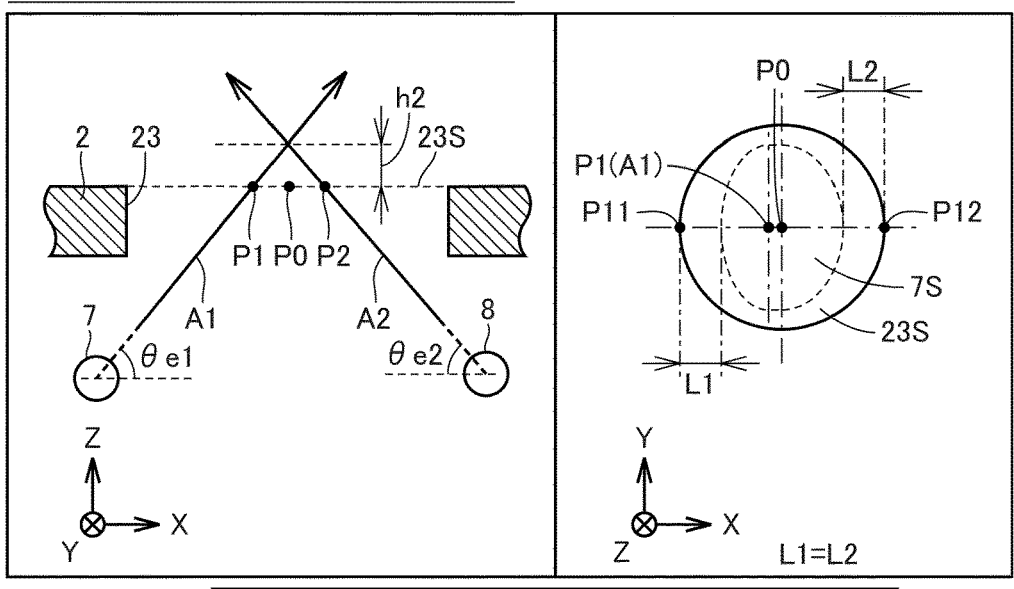
FIG. 8 is a diagram describing the relation between the opening surface, the optical axis of the primary X-rays, the detector axis, and the irradiation surface according to Embodiment 3.

Next, referring to FIG. 7 and FIG. 8, Embodiment 3 will be described. FIG. 7 is a diagram showing the main parts of the X-ray fluorescence analyzer 102 according to Embodiment 3. FIG. 8 is a diagram describing the relation between the opening surface 23S, the optical axis A1 of the primary X-rays, the detector axis A2, and the irradiation surface 7S according to Embodiment 3. FIG. 7 is intended to be contrasted with FIG. 5, which illustrates Embodiment 2. FIG. 8 is intended to be contrasted with FIG. 6, which illustrates Embodiment 2.

Embodiment 3 will be described in contrast to Embodiment 2. In Embodiment 2, the collimator 71 with the circular-shaped aperture 701 is used. In contrast, in Embodiment 3, a collimator 72 with an elliptical-shaped aperture 702 is used, as shown in FIG. 7. In Embodiment 3, the collimator 72 is placed in the measurement chamber 5 so that the major axis of the ellipse of the aperture 702 becomes parallel to the Y-axis when viewed from the direction of the optical axis A1.

Embodiment 3 has the same configuration as Embodiment 2, except that the collimator 72 is employed in place of the collimator 71. Hence, in Embodiment 3, as in Embodiment 2, the optical axis A1 passes through the point P1 on the opening surface 23S, and the detector axis A2 passes through the point P2 on the opening surface 23S. Therefore, according to Embodiment 3, the same effects as those described in Embodiment 2 is achieved.

In Embodiment 3, the collimator 72 with the elliptical-shaped aperture 702 is utilized, resulting in a shape of the irradiation surface 7S formed on the opening surface 23S that differs from that in Embodiment 2. As shown in FIG. 8, in Embodiment 3, the size of the irradiation surface 7S in the Y-axis direction is enlarged compared with Embodiment 2.

According to Embodiment 3, the size of the irradiation surface 7S in the Y-axis direction can be expanded compared with Embodiment 2. Note that it is sufficient for the aperture 702 to be more elongated in the Y-axis direction than in the X-axis direction, and it may take various shapes, including an ellipse, a rectangular slot, and a polygon. Further, the apertures 702 of the collimator 72 may be configured to have shapes, such as an ellipse, an elongated aperture, and a polygon, when viewed from the direction of the optical axis A1. For example, a collimator with a circular-shaped aperture may be positioned at an angle relative to the optical axis A1. More specifically, the collimator 71 shown in FIG. 2 may be arranged with the Y-axis as the rotation axis and rotated by a predetermined angle. In this case, the projection of the circular aperture 701 forms an ellipse.

The size of the aperture 702 of the collimator 72 is larger in the first direction (Y-axis direction), which is orthogonal to the line segment (P11 to P12) in the opening surface 23S, than in the second direction (Z-axis direction), which is orthogonal to the first direction and the opening surface 23S, when viewed from the direction of the optical axis A1.

Note that the size of the minor axis of the ellipse constituting the aperture 702 may be, for example, the same as the diameter of the circle constituting the aperture 701 of the collimator 71. In this case, the aperture 702 of the collimator 72 according to Embodiment 3 is constituted by the ellipse formed by stretching the aperture 701 of the collimator 71 employed in Embodiment 2 in the Y-axis direction.

When the minor axis of the ellipse constituting the aperture 702 of the collimator 72 is made equal to the diameter of the circle constituting the aperture 701 of the collimator 71 according to Embodiment 2, the size of the irradiation surface 7S according to Embodiment 3 will be the same as that of the irradiation surface 7S in Embodiment 2 in the X-axis direction. In this case, the first margin L1 and the second margin L2 are identical in Embodiment 3 and Embodiment 2.

Embodiment 4

Figure 9:
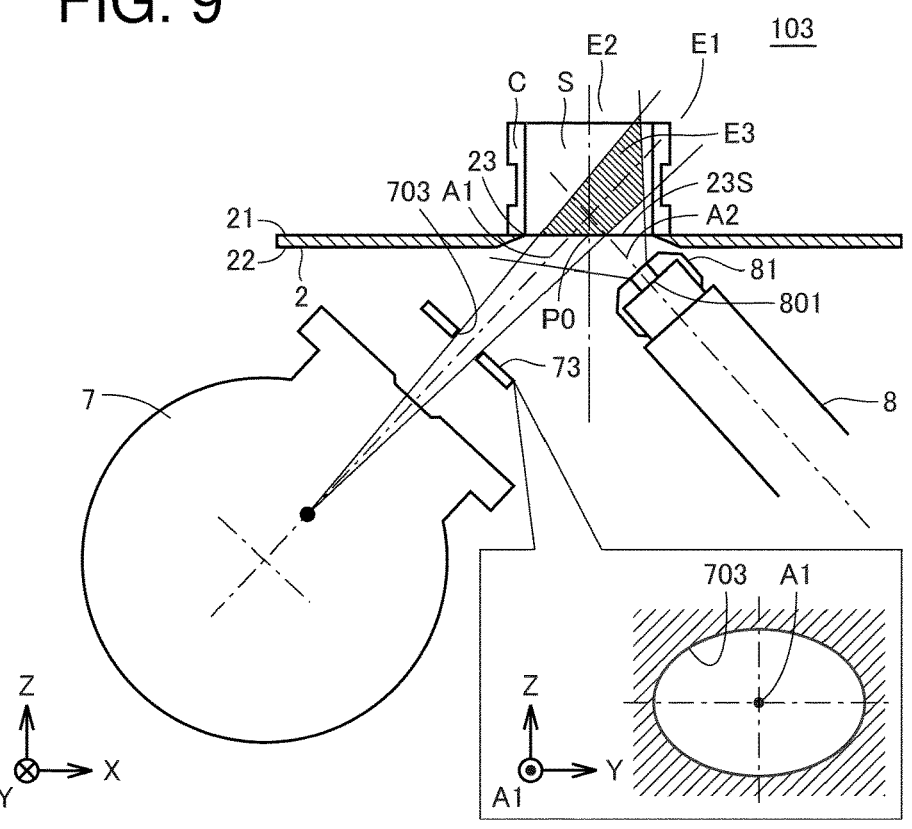
FIG. 9 is a diagram showing the main parts of the X-ray fluorescence analyzer according to Embodiment 4.
Figure 10:
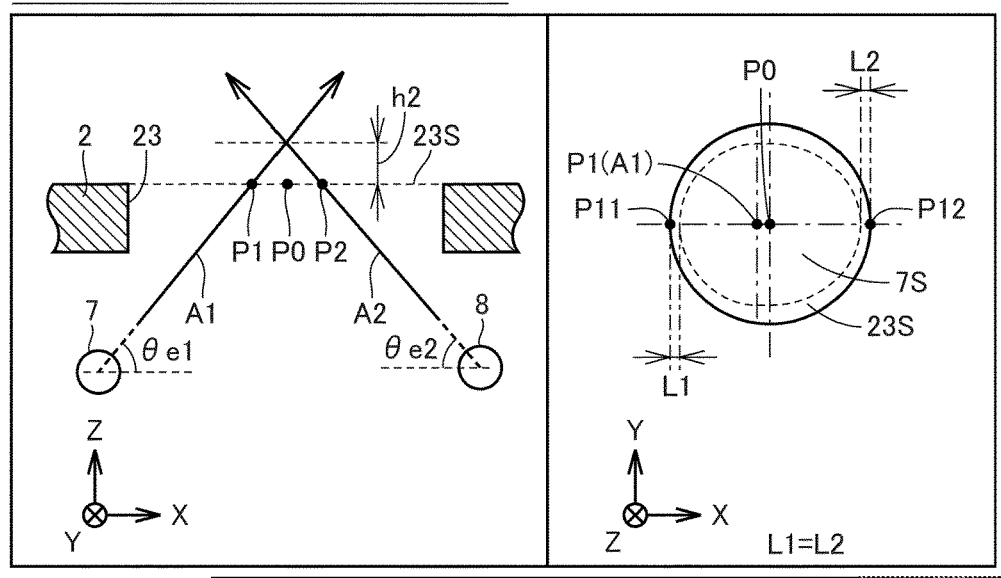
FIG. 10 is a diagram describing the relation between the opening surface, the optical axis of the primary X-rays, the detector axis, and the irradiation surface according to Embodiment 4.

Next, referring to FIG. 9 and FIG. 10, Embodiment 4 will be described. FIG. 9 is a diagram showing the main parts of the X-ray fluorescence analyzer 103 according to Embodiment 4. FIG. 10 is a diagram describing the relation between the opening surface 23S, the optical axis A1 of the primary X-rays, the detector axis A2, and the irradiation surface 7S according to Embodiment 4. FIG. 9 is intended to be contrasted with FIG. 7, which describes Embodiment 3. FIG. 10 is intended to be contrasted with FIG. 8, which illustrates Embodiment 3.

Embodiment 4 will be described in contrast to Embodiment 3. Embodiment 3 uses the collimator 72 with an elliptical-shaped aperture 702. In Embodiment 4, a collimator 73 is employed in place of the collimator 72 (see FIG. 9). The aperture 703 of the collimator 73 is elliptical in shape. The aperture 703 of the collimator 73 in Embodiment 4 is larger in size in the direction of the minor axis of the ellipse than the aperture 702 of the collimator 72 in Embodiment 3.

For example, the size of the aperture 703 in the major axis direction is identical to the size of the aperture 702 in the major axis direction. In Embodiment 4, as in Embodiment 3, the collimator 73 is placed in the measurement chamber 5 so that the major axis direction of the ellipse aligns with the Y-axis direction.

Embodiment 4 has the same configuration as Embodiment 3, except that the collimator 73 is employed in place of the collimator 72. Therefore, according to Embodiment 4, the same effects as those described in Embodiment 3 are achieved.

The collimator 73 employed in Embodiment 4 has an aperture 703 whose minor axis is lengthened relative to the ellipse that constitutes the aperture 702 of the collimator 72. The minor axis of the ellipse affects the size of the irradiation surface 7S along the X-axis direction, which is projected onto the opening surface 23S. Therefore, in Embodiment 4, the size of the irradiation surface 7S in the X-axis direction is enlarged compared with Embodiment 3. This is apparent by comparing FIG. 8, which illustrates Embodiment 3, with FIG. 10, which illustrates Embodiment 4.

According to Embodiment 4, the size of the irradiation surface 7S in the X-axis direction can be expanded compared with Embodiment 3. In particular, according to Embodiment 4, it is possible to expand the irradiation surface 7S not only in the Y-axis direction but also in the X-axis direction, which makes it possible to expand the entire circumference of the irradiation surface 7S close to the edge of the opening surface 23S.

Here, by describing Embodiment 4 in comparison to Comparative Example (see FIG. 16 and FIG. 17), the superiority of Embodiment 4 over the Comparative Example will be made clearer. As already described, in Comparative Example, the X-ray optical axis A1 passes through the central point P0 of the opening surface 23aS. Therefore, in Comparative Example, the first margin L1 and the second margin L2 of the irradiation surface 7a in the X-axis direction are different. As a result, in Comparative Example, the size of the irradiation surface 7aS in the X-axis direction cannot be sufficiently enlarged. In other words, in Comparative Example, the bottom surface (irradiation surface 7aS) of the cone forming the overlapping range E3 must be narrower.

Further, in Comparative Example, the detector axis A2 also passes through the central point P0 of the opening surface 23aS in the same manner as the optical axis A1. In other words, in Comparative Example, the X-ray optical axis A1 and the detector axis A2 pass through the central point P0 of the opening surface 23aS. Therefore, in Comparative Example, the height of the cone forming the overlapping range E3 is low.

Additionally, in Comparative Example, the shape of the aperture 701a of the collimator 71a is circular. Therefore, in Comparative Example, the size of the irradiation surface 7aS in the Y-axis direction is much smaller than the size of the irradiation surface 7aS in the X-axis direction. As a result, the size of the bottom surface (irradiation surface 7aS) of the cone forming the overlapping range E3 is reduced.

Thus, in Comparative Example, the height of the cone forming the overlapping range E3 is low, and the bottom surface of the cone (irradiation surface 7aS) is small. Therefore, Comparative Example has a problem that the effective range (overlapping range E3) for measuring a sample is narrow.

Embodiment 4 has the features of Embodiments 1 to 3 described above. In Embodiment 1, the position at which the optical axis A1 of the X-ray passes through the opening surface 23S is offset from the central point P0 of the opening surface 23S to the point P1. As a result, in Embodiment 1, the first margin L1 and the second margin L2 are adjusted to be of the same size. With this, it becomes possible to sufficiently enlarge the irradiation surface 7S in the X-axis direction. In Embodiment 1, the position at which the optical axis A1 of the X-ray passes through the opening surface 23S is offset from the central point P0 of the opening surface 23S to the point P1, and therefore, the overlapping area E3 is expanded in the positive direction of the Z-axis.

Embodiment 2 corresponds to the configuration in which the position at which the detector axis A2 passes through the opening surface 23S differs from that in Embodiment 1. In Embodiment 2, the position at which the detector axis A2 passes through the opening surface 23S is offset from the central point P0 of the opening surface 23S to the point P2. As a result, in Embodiment 2, the overlapping range E3 between the irradiation range E1 and the detection range E2 is expanded further in the positive Z-axis direction compared with Embodiment 1.

Embodiment 3 corresponds to the configuration in which the collimator 71 is replaced by the collimator 72 in Embodiment 2. The collimator 72 has an aperture 702 of an elliptical shape. In Embodiment 3, the collimator 72 is placed in the measurement chamber 5 so that the major axis of the ellipse constituting the aperture 702 is parallel to the Y-axis. According to Embodiment 3, the size of the irradiation surface 7S is enlarged in the Y-axis direction compared with Embodiment 2.

Embodiment 4 has the features of Embodiments 1 to 3 outlined above. Further, Embodiment 4 corresponds to the configuration in which the collimator 72 is replaced by the collimator 73 in Embodiment 3. Therefore, Embodiment 4 makes it possible to expand the entire circumference of the irradiation surface 7S to near the edge of the opening surface 23S, as described above. Therefore, according to Embodiment 4, the sample can be analyzed by making more effective use of the opening surface 23S through which X-rays can pass-through, compared with Comparative Example.

Embodiment 5

Figure 11:
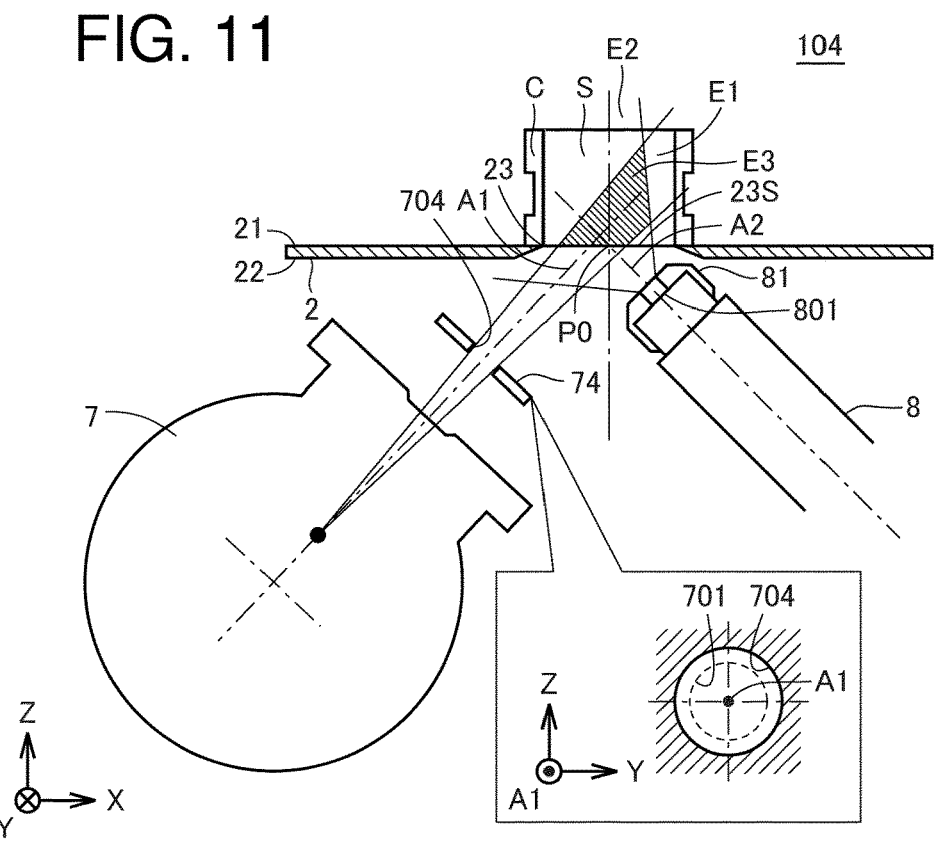
FIG. 11 is a diagram showing the main parts of the X-ray fluorescence analyzer according to Embodiment 5.
Figure 12:
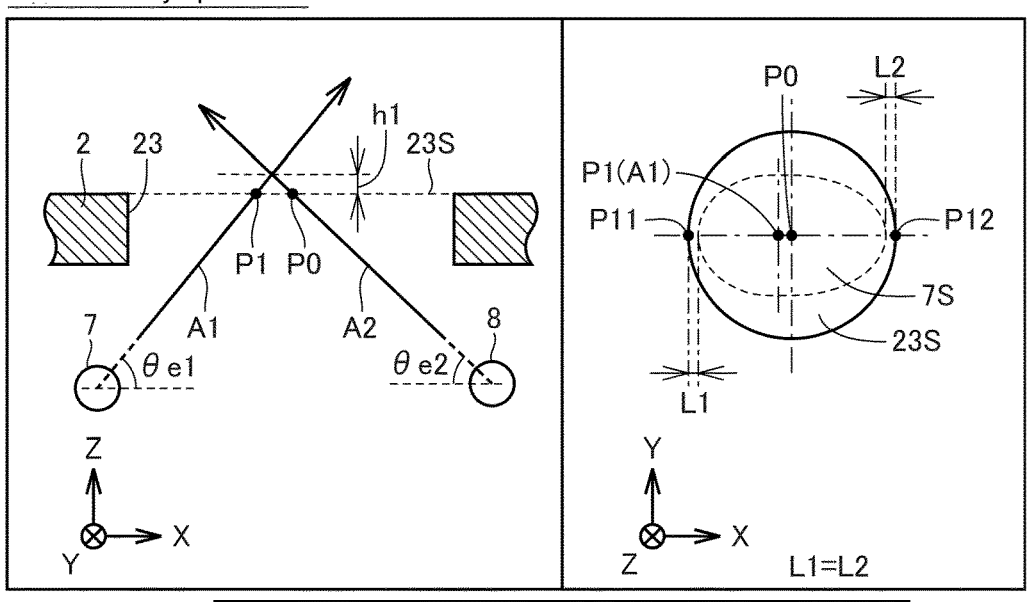
FIG. 12 is a diagram describing the relation between the opening surface, the optical axis of the primary X-rays, the detector axis, and the irradiation surface according to Embodiment 5.

Next, referring to FIG. 11 and FIG. 12, Embodiment 5 will be described. FIG. 11 is a diagram showing the main parts of the X-ray fluorescence analyzer 104 according to Embodiment 5. FIG. 12 is a diagram describing the relation between the opening surface 23S, the optical axis A1 of the primary X-rays, the detector axis A2, and the irradiation surface 7S according to Embodiment 5. FIG. 11 is intended to be contrasted with FIG. 2, which illustrates Embodiment 1. FIG. 12 is intended to be contrasted with FIG. 4, which illustrates Embodiment 1.

Embodiment 5 will be described in contrast to Embodiment 1. In Embodiment 1, the position at which the optical axis A1 of the X-ray passes through the opening surface 23S is offset from the central point P0 of the opening surface 23S to the point P1. As a result, in Embodiment 1, the first margin L1 and the second margin L2 are adjusted to the same size (see FIG. 4). Example 5 shows an example in which a collimator with an aperture of an increased size is utilized in Embodiment 1 with the margin already adjusted as described above.

In Embodiment 1, the collimator 71 is used (see FIG. 2). In contrast, in Embodiment 5, the collimator 74 is used. As shown in FIG. 11, the aperture 704 of the collimator 74 is larger than the aperture 701 of the collimator 71. In Embodiment 1, it is possible to reduce the margin without considering the variation of the first margin L1 and the second margin L2. Therefore, like Embodiment 5, it is possible to increase the size of the aperture of the collimator to be larger than the size of the aperture 701 according to Embodiment 1.

This enlarges the size of the X-axis direction of the irradiation surface 7S according to Embodiment 5 (see FIG. 12) compared with the size (see FIG. 4) of the X-axis direction of the irradiation surface 7S according to Embodiment 1.

Embodiment 6

Figures 13, 14:
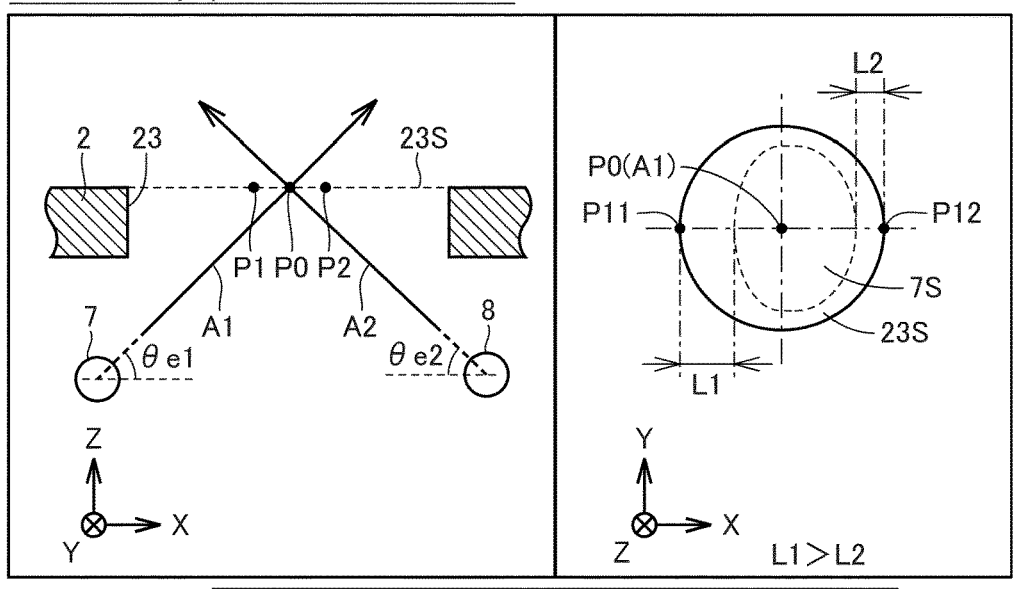
FIG. 13 is a diagram showing the main parts of the X-ray fluorescence analyzer according to Embodiment 6.
FIG. 14 is a diagram describing the relation between the opening surface, the optical axis of the primary X-rays, the detector axis, and the irradiation surface according to Embodiment 6.

Next, referring to FIG. 13 and FIG. 14, Embodiment 6 will be described. FIG. 13 is a diagram showing the main parts of the X-ray fluorescence analyzer 105 according to Embodiment 6. FIG. 14 is a diagram describing the relation between the opening surface 23S, the optical axis A1 of the primary X-rays, the detector axis A2, and the irradiation surface 7S according to Embodiment 6. FIG. 13 is intended to be contrasted with FIG. 7, which illustrates Embodiment 3. FIG. 14 is intended to be contrasted with FIG. 8, which illustrates Embodiment 3.

Embodiment 6 will be described in contrast to Embodiment 3. Embodiment 6 differs from Embodiment 3 in the position at which the X-ray optical axis A1 and the detector axis A2 pass through the opening surface 23S. In Embodiment 6, the X-ray optical axis A1 and the detector axis A2 pass through the central point P0 of the opening surface 23S (see FIG. 14). In Embodiment 3, the X-ray optical axis A1 passes through the point P1 of the opening surface 23S, and the detector axis A2 passes through the point P2 of the opening surface 23S (see FIG. 8).

Embodiment 6 has the same configuration as Embodiment 3, except for the position at which the optical axis A1 and the detector axis A2 pass through the opening surface 23S. Therefore, in Embodiment 6, as in Embodiment 3, a collimator 72 with an elliptically-shaped aperture 702 is used (see FIG. 13). In Embodiment 6, the optical axis A1 of the X-rays passes through the central point P0 of the opening surface 23S, so the first margin L1 and the second margin L2 of the irradiation surface 7S relative to the opening surface 23S differ (see FIG. 14). For this reason, in Embodiment 6, there is not enough room to increase the size of the irradiation surface 7S in the X-axis direction. In Embodiment 3, such a margin exists. However, according to Embodiment 6, like Embodiment 3, it is possible to increase the size of the irradiation surface 7S in the Y-axis direction beyond that of Embodiment 2 (see FIG. 14). Embodiment 3, therefore, shows a method of enlarging the irradiation surface 7S while adopting a configuration in which the optical axis A1 of the X-rays passes through the central point P0 of the opening surface 23S.

[Comparison Table]

FIG. 15 shows a comparison table for comparing the configuration of each Embodiment and Comparative Example. By referring to the comparison table, the characteristics of each Embodiment and Comparative Example described above can be checked item by item. Items to be compared include the pass-through position of the optical axis A1 of the X-ray, the pass-through position of the detector axis A2, the aperture of the collimator, and the shape of the aperture of the collimator. In particular, by referring to the comparison table, it can be confirmed that distinctive configurations that differ from Comparative Example have been added from Embodiment 1 to Embodiment 4 in a stepwise manner.

[Aspects]

It should be understood by those skilled in the art that the above-described embodiments and modifications thereof are specific examples of the following aspects.

(Item 1)

An X-ray fluorescence analyzer according to one aspect of the present disclosure is an X-ray fluorescence analyzer for analyzing a sample, comprising:

a sample stage provided with a pass-through surface through which primary X-rays pass;

an X-ray source configured to emit the primary X-rays such that an optical axis of the primary X-rays intersects with the pass-through surface obliquely; and a detector configured to detect fluorescent X-rays emitted from the sample when the sample arranged to cover the pass-through surface is irradiated with the primary X-rays, wherein the optical axis passes through the pass-through surface at a position closer to the X-ray source than a midpoint of a line segment connecting both ends of the pass-through surface along the optical axis, when the sample stage is viewed in plan view.

According to the X-ray fluorescence analyzer recited in the above-described Item 1, it is possible to extend the irradiation range of X-rays relative to the sample.

(Item 2)

In the X-ray fluorescence analyzer as recited in the above-described Item 1, the primary X-rays are irradiated onto the pass-through surface, which forms an irradiation surface of the primary X-rays on the pass-through surface, and when the sample stage is viewed in plan view, a first distance from one end of the irradiation surface that intersects with the line segment to the midpoint and a second distance from the other end of the irradiation surface that intersects with the line segment to the midpoint are equal.

According to the X-ray fluorescence analyzer as recited in the above-described Item 2, the first distance and the second distance, which are the margins of the irradiation surface with respect to the pass-through surface, can be reduced.

(Item 3)

In the X-ray fluorescence analyzer as recited in the above-described Item 1 or 2, further comprising:

an adjustment member provided between the X-ray source and the pass-through surface, the adjustment member having an aperture to adjust a size of a beam of the primary X-rays, wherein when viewed along a direction of the optical axis, a size of the aperture is greater in a first direction orthogonal to the line segment in the pass-through surface than in a second direction orthogonal to both the first direction and the pass-through surface.

According to the X-ray fluorescence analyzer as recited in the above-described Item 3, it is possible to reduce the margin of the irradiation surface with respect to the pass-through surface in the first direction.

(Item 4)

In the X-ray fluorescence analyzer as recited in the above-described Item 3, a shape of the aperture is an ellipse.

According to the X-ray fluorescence analyzer as recited in the above-described Item 4, it is possible to reduce the margin of the irradiation surface relative to the pass-through surface in the first direction, which corresponds to the major axis direction of the ellipse.

(Item 5)

In the X-ray fluorescence analyzer as recited in any one of the above-described Items 1 to 4, in a plan view of the sample stage, a central axis of a detection range of the detector passes through the pass-through surface at a position on the line segment, the position being farther from the X-ray source than the midpoint, and in a plane including the optical axis and perpendicular to the pass-through surface, the optical axis and the central axis intersect on a side where the sample is arranged, out of both sides of the pass-through surface.

According to the X-ray fluorescence analyzer as recited in the above-described Item 5, the overlapping range between the X-ray irradiation range and the detection range of the detector extends toward the side where the sample is placed, which can expand the range in which the sample can be measured.

(Item 6)

In the X-ray fluorescence analyzer as recited in any one of the above-described Items 1 to 5, a sample is placed on the pass-through surface using a sample container.

According to the X-ray fluorescence analyzer as recited in the above-described Item 6, the sample can be placed on the pass-through surface using the sample container.

(Item 7)

In the X-ray fluorescence analyzer as recited in any one of the above-described Items 1 to 6, the pass-through surface is constituted by an opening surface of a through-hole formed in the sample stage.

According to the X-ray fluorescence analyzer as recited in the above-described Item 7, the pass-through surface is constituted by an opening surface.

(Item 8)

An X-ray fluorescence analyzer is an X-ray fluorescence analyzer for analyzing a sample. The An X-ray fluorescence analyzer includes:

a sample stage provided with a pass-through surface through which primary X-rays pass;

an X-ray source configured to emit the primary X-rays such that an optical axis of the primary X-rays intersects with the pass-through surface obliquely;

a detector configured to detect fluorescent X-rays emitted from the sample when the sample arranged to cover the pass-through surface is irradiated with the primary X-rays; and an adjustment member provided between the X-ray source and the pass-through surface, the adjustment member having an aperture to adjust a size of a beam of the primary X-rays, wherein in a case of assuming a line segment connecting both ends of the pass-through surface along the optical axis when the sample stage is viewed in plan view, when viewed along a direction of the optical axis, a size of the aperture is greater in a first direction orthogonal to the line segment in the pass-through surface than in a second direction orthogonal to both the first direction and the pass-through surface.

According to the X-ray fluorescence analyzer recited in the above-described Item 8, it is possible to extend the irradiation range of X-rays relative to the sample.

While illustrative embodiments of the present disclosure have been described herein, the present disclosure is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. An X-ray fluorescence analyzer for analyzing a sample, comprising:

a sample stage provided with a pass-through surface through which primary X-rays pass;

an X-ray source configured to emit the primary X-rays such that an optical axis of the primary X-rays intersects with the pass-through surface obliquely; and a detector configured to detect fluorescent X-rays emitted from the sample when the sample arranged to cover the pass-through surface is irradiated with the primary X-rays, wherein the optical axis passes through the pass-through surface at a position closer to the X-ray source than a midpoint of a line segment connecting both ends of the pass-through surface along the optical axis, when the sample stage is viewed in plan view.

2. The X-ray fluorescence analyzer as recited in claim 1, wherein the primary X-rays are irradiated onto the pass-through surface, which forms an irradiation surface of the primary X-rays on the pass-through surface, and wherein when the sample stage is viewed in plan view, a first distance from one end of the irradiation surface that intersects with the line segment to the midpoint and a second distance from the other end of the irradiation surface that intersects with the line segment to the midpoint are equal.

3. The X-ray fluorescence analyzer as recited in claim 1, further comprising:

an adjustment member provided between the X-ray source and the pass-through surface, the adjustment member having an aperture to adjust a size of a beam of the primary X-rays, wherein when viewed along a direction of the optical axis, a size of the aperture is greater in a first direction orthogonal to the line segment in the pass-through surface than in a second direction orthogonal to both the first direction and the pass-through surface.

4. The X-ray fluorescence analyzer as recited in claim 3, wherein a shape of the aperture is an ellipse.

5. The X-ray fluorescence analyzer as recited in claim 1, wherein in a plan view of the sample stage, a central axis of a detection range of the detector passes through the pass-through surface at a position on the line segment, the position being farther from the X-ray source than the midpoint, and wherein in a plane including the optical axis and perpendicular to the pass-through surface, the optical axis and the central axis intersect on a side where the sample is arranged, out of both sides of the pass-through surface.

6. The X-ray fluorescence analyzer as recited in claim 1, wherein a sample is placed on the pass-through surface using a sample container.

7. The X-ray fluorescence analyzer as recited in claim 1, wherein the pass-through surface is constituted by an opening surface of a through-hole formed in the sample stage.

8. An X-ray fluorescence analyzer for analyzing a sample, comprising:

a sample stage provided with a pass-through surface through which primary X-rays pass;

an X-ray source configured to emit the primary X-rays such that an optical axis of the primary X-rays intersects with the pass-through surface obliquely;

a detector configured to detect fluorescent X-rays emitted from the sample when the sample arranged to cover the pass-through surface is irradiated with the primary X-rays; and an adjustment member provided between the X-ray source and the pass-through surface, the adjustment member having an aperture to adjust a size of a beam of the primary X-rays, wherein in a case of assuming a line segment connecting both ends of the pass-through surface along the optical axis when the sample stage is viewed in plan view, when viewed along a direction of the optical axis, a size of the aperture is greater in a first direction orthogonal to the line segment in the pass-through surface than in a second direction orthogonal to both the first direction and the pass-through surface.

* * * * *